United States Patent [19]

Miller

[11] Patent Number: 4,527,980

[45] Date of Patent: Jul. 9, 1985

[54] FLIGHT SIMULATING VIDEO GAME

[76] Inventor: Robert W. Miller, 1235 - 19th St., Hermosa Beach, Calif. 90254

[21] Appl. No.: 432,244

[22] Filed: Apr. 7, 1983

[51] Int. Cl.³ .............................................. G09B 9/08
[52] U.S. Cl. .................................... 434/55; 272/1 C; 434/51
[58] Field of Search ................ 434/51, 55, 56, 57, 434/58, 59, 46, 43, 44, 38, 33; 272/1 C, 17, 18, 338; 280/758

[56] References Cited

U.S. PATENT DOCUMENTS

| | | | |
|---|---|---|---|
| 2,323,322 | 7/1943 | Geisse | 434/56 |
| 2,336,711 | 12/1943 | Barber | 434/51 |
| 2,684,243 | 7/1954 | Alston | 272/1 C |
| 3,494,052 | 2/1970 | Corlyon | 434/55 |
| 3,720,007 | 3/1973 | McKechnie et al. | 434/43 |

Primary Examiner—William H. Grieb
Attorney, Agent, or Firm—I. Michael Bak-Boychuk

[57] ABSTRACT

An enclosure generally shaped to simulate the appearance of a flight vehicle is provided with a seat facing a video display and is supported on a parabolic dish for freedom of angular motion in the pitch and roll modes. Included in the enclosure may be a weighted control stick which, according to its angular displacement, displaces the effective center of gravity, thus moving the enclosure in the pitch and roll modes. A set of orthogonal resolvers deployed in the enclosure and pendulum articulated provide binary signals of the pitch and roll angles achieved to the video display, simulating the flight vehicle attitude while a program is cycled through a microprocessor and superposed onto the pitch and roll inputs to generate on the video screen images simulating flight.

8 Claims, 5 Drawing Figures

FLIGHT SIMULATING VIDEO GAME

BACKGROUND OF THE INVENTION

1. Field of the Invention

The present invention relates to video game systems, and more particularly to a video game which amongst its features simulates attitude changes that may occur in flight.

2. Description of the Prior Art

The art entailed in simulating dynamics of motion of a flight vehicle has been well developed in the past. Most frequently such simulators entail complex hydraulic systems which in response to calculated dynamics of motion of the flight vehicle simulated develop the necessary seat and spine force and attitude inputs to duplicate the forces and attitudes perceived during flight. In addition such simulators also include CRT displays which in one way or another present a visual image to the occupant, emulating such information as horizon and vehicle altitude. To achieve the necessary fidelity such simulators, however, entail extremely expensive logic and mechanical features and thus any use thereof for entertainment purposes is prohibited by cost. Simply, the prior art is sparse or practically wholly devoid of any inexpensive techniques for duplicating the stability and motion characteristics of an aircraft.

While the mechanical aspects of the simulator have been relatively inactive in the recent past, developments in microcircuitry have taken great strides as evidenced by the many video games in the market. Thus the limiting criteria now in effect is the cost and complexity of the mechanical actuation system simulating attitude and motion effects. It is the implementation of inexpensive attitude and motion emulating mechanisms that is therefore disclosed herein.

SUMMARY OF THE INVENTION

Accordingly, it is the general purpose and object of the present invention to provide a simple and inexpensive mechanism for emulating the angular motions of a flight vehicle.

Other objects of the invention are to provide an inexpensive motion emulator which conveniently adapts with video displays.

Yet additional objects of the invention are to provide an inexpensive flight simulator which by virtue of its characteristics provides a relatively high fidelity of emulated motion.

Briefly, these and other objects are accomplished within the present invention by providing an enclosed structure generally shaped to duplicate the appearance of a flight vehicle which is supported on a parabolic dish and which thus will attain various angular attitudes depending on the alignment of the center of gravity thereof. The enclosure may be provided with a hatch or canopy through which the occupant may enter or exit and within which a video display screen may be housed. A set of orthogonal resolvers may then be used to determine the attitude of the assembly, the resolvers then being fed to the necessary logic controlling the video display. This combination of the enclosure and the video display may then be aligned in angular alignment relative ground by a weighted control stick arrangement which when displaced fore and aft or laterally displaces the effective center of gravity to thus control the motion.

In addition to the foregoing features the simulated flight vehicle may be provided with controls like throttle control similarly fed to the image logic which may also be tied to vary the centering spring tension on the control stick. In this manner all of the necessary controls may be conveniently emulate d, emulating through the logic the consequent flight response which is displayed on the screen.

It is to be noted that the use of a parabaloid to support the above structure provides a set of lines of force commonly described as a "metacentric parabala", a characteristic used to advantage in selecting shapes of hulls in boats. In a manner similar to a floating vehicle this metacentric perabala defines the extent of stability for angular displacement that can occur before the vehicle rolls over. In similar analytic approach it is possible to select the geometry of the perabaloid or the perabalic dish supporting the present structure and the center of gravity thereof such that the center of gravity displacement occurring as result of control stick motion will result in attitude changes within the stable regions thereof. Thus the occupant is able to manipulate the attitudes of the simulated flight vehicle and maintain such attitude changes through the use of the control stick which are then displayed on the screen through image modification accomplished by the logic.

Alternatively, the stick may be tied to a plurality of lines which pass around turning rollers tie to the floor around the parabolic dish and, once again, the displacement of the control stick results in attitude change.

In addition to the foregoing features the parabolic dish may be tied to a pneumatic pressurization system vented through a solenoid valve which may be programmed to simulate turbulence, explosions, and other shock input events. Thus a full simulation of attitude and shock can be implemented simulating with reasonable fidelity motions of an aircraft with the display on the screen providing the occupant all of the physical inputs that occur in flight. The use of a parabaloid or a dished parabolic support makes the implementation thereof quite simple and inexpensive, the structure of the parabolic dish being quite similar to the structure of a parabalic dish antenna.

DESCRIPTION OF THE PREFERRED EMBODIMENT

Figure 1:
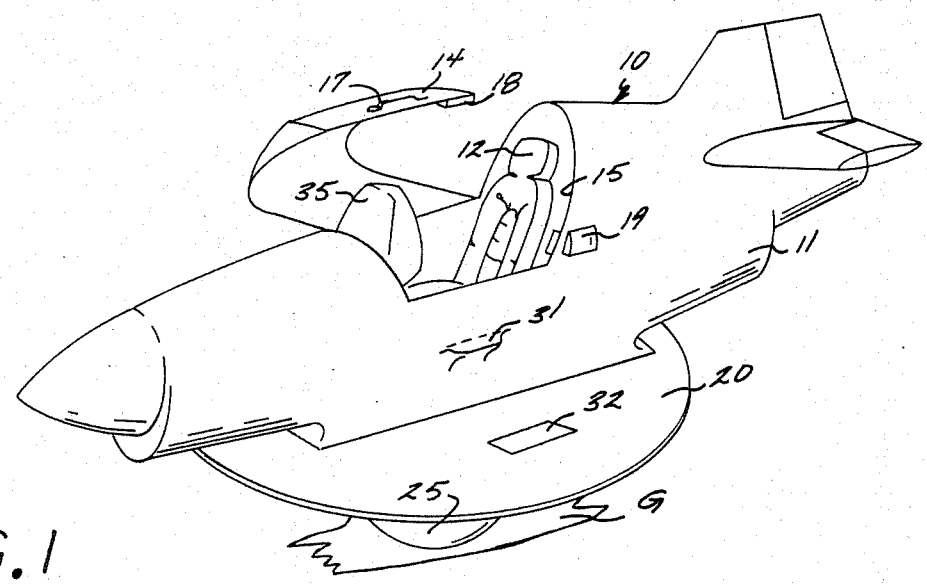
FIG. 1 is a perspective illustration of an inventive entertainment device conformed as a flight article according to the teachings herein.
Figure 2:
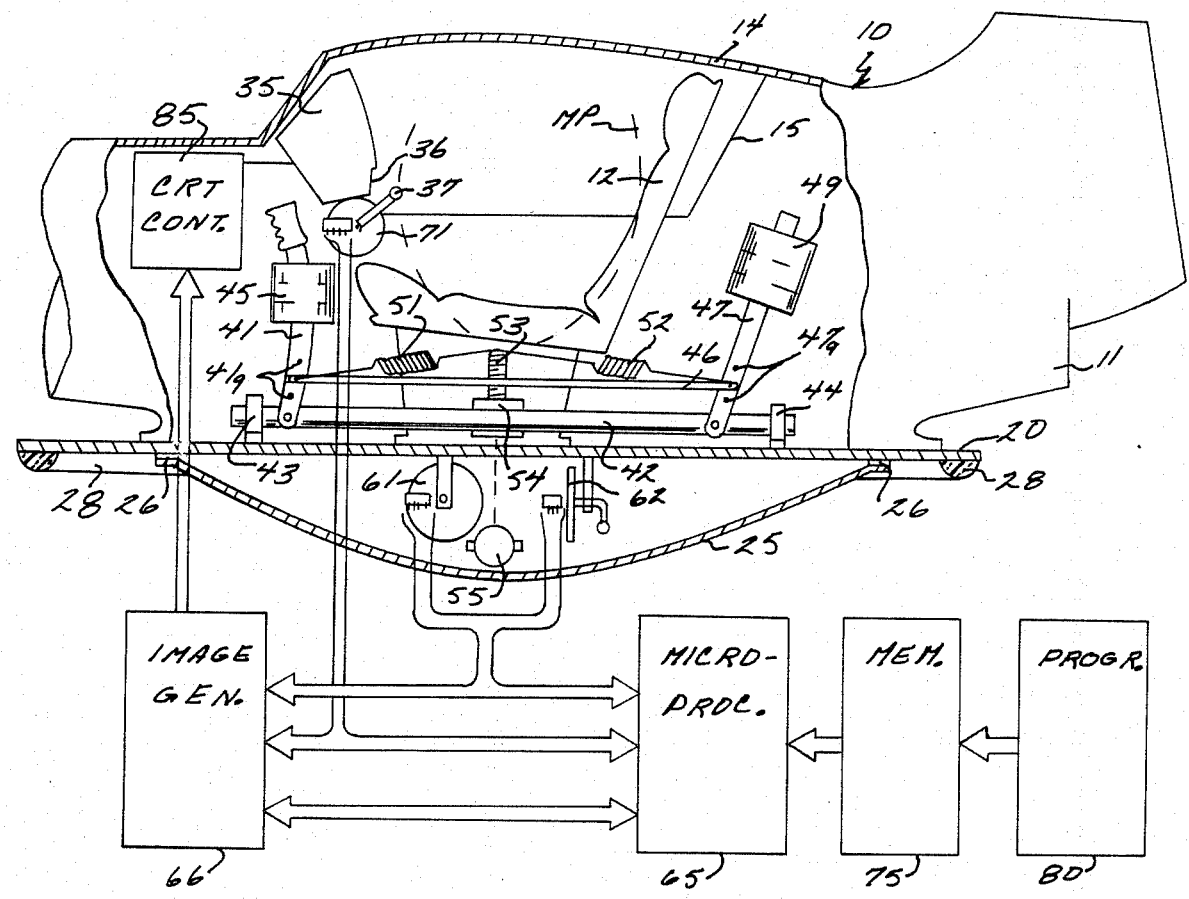
FIG. 2 is a side view, in partial section, of the flight vehicle shown in FIG. 1 including diagrammatic illustrations of the logic cooperating therewith.
Figure 3:
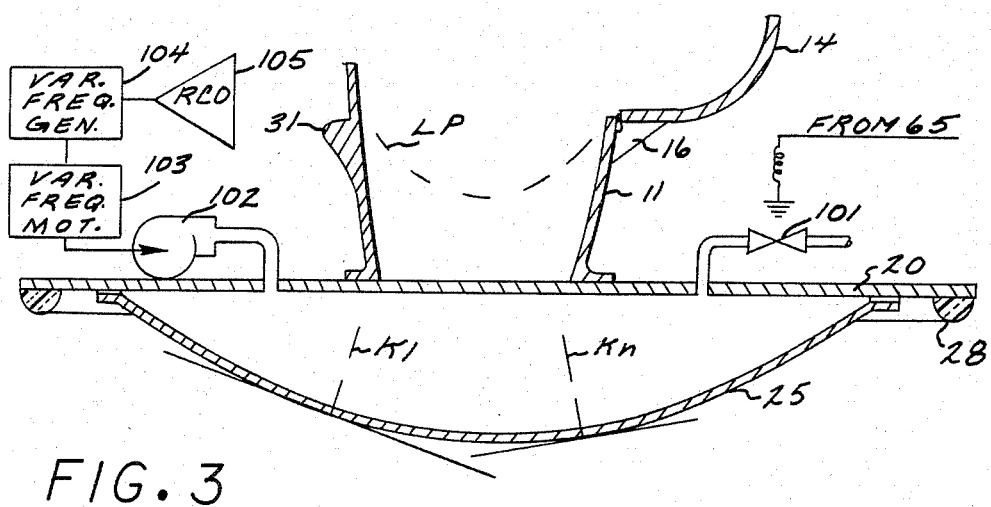
FIG. 3 is a front view, in partial section, illustrating the vehicle shown in FIG. 2.

As shown in FIGS. 1, 2 and 3, the inventive flight vehicle emulator, generally designated by the numeral 10, comprises a hollow enclosure 11 conformed to generally approximate the appearance of a flight vehicle and including a seat 12 arranged within the confines of a cabin formed by a hinged, opaque canopy 14, arranged to pivot from a closed position over a cabin cut-out 15 in the surface of the vehicle or container 11 to an open position supported by a triangular bracket 16. Canopy 14 may include a handle 17 and a latching mechanism 18 of known configuration which engages a coin operated latch 19 in the enclosure 11. Enclosure 11, in turn, may be supported and attached to the top surface of a circular disk 20 which on the bottom surface thereof is attached to a parabolic dish or a paraboloid surface 25. This paraboloid surface 25 may be generally shaped in a manner similar to a parabolic dished antenna being attached by fasteners around the periphery thereof through a seal or grommet 26 to the underside of disk 20. The peripheral edge of disk 20 on its lower surface may further include a rubber strip or bumper 28 which thus limits the angular excursion to which dish 25 may be pivoted over the ground surface G. To facilitate convenient egress and ingress through the cut-out or opening 15 the side of the enclosure 11 may include steps or other projections 31 and the upper surface of disk 20 may be demarked with stepping areas 32 which direct the user into an orderly sequence of stepping motions during mounting and dismounting. Once the user or occupant is in correct position on seat 12 the opaque canopy 14 may then be pivoted shut eliminating all ambient light sources except for the image generated on a video screen 35 mounted in the forward end of cut-out or opening 15 in visual alignment with seat 12. This video screen 35 may be further provided with a subjacent control panel 36 on which various dials and other control functions may be provided and which furthermore may support a pivoted throttle handle 37 emulating the throttle motion of a simulated aircraft. Similarly once the occupant is in position in seat 12 his legs may straddle a control stick 41 which, according to the illustration in FIG. 2, is pivotally mounted on a tube 42 retained for rotation in two end bearings 43 and 44 attached to the upper surface of disk 20 and passing subjacent seat 12. Stick 41 may be supported thereon a plurality of annular weights 45 and may be linked through a control link 46 to a similarly pivoted augmentation rod 47 extending from tube 42 in the confines of enclosure 11 behind seat 12. Rod 47 once again may carry another set of annular weights 49 which by virtue of this linkage will pivot and align in coherent relative motion with stick 41.

To allow for adjustment over the fore and aft weight displacement with the motion of control stick 41 the link 46 may be pinned to stick 41 and rod 47 at various link pin openings 41a and 47a thus providing more or less weight unbalance response in the longitudinal or pitch mode as opposed to the lateral or roll mode. In addition, these linkage points may further be tied to the free ends of two centering springs 51 and 52 which at their other ends are tied in common to a worm screw 53 supported in a ball nut 54 suspended from the underside of seat 12. Ball nut 54, in turn, may be driven by a servo motor 55 according to the description following.

Figure 4:
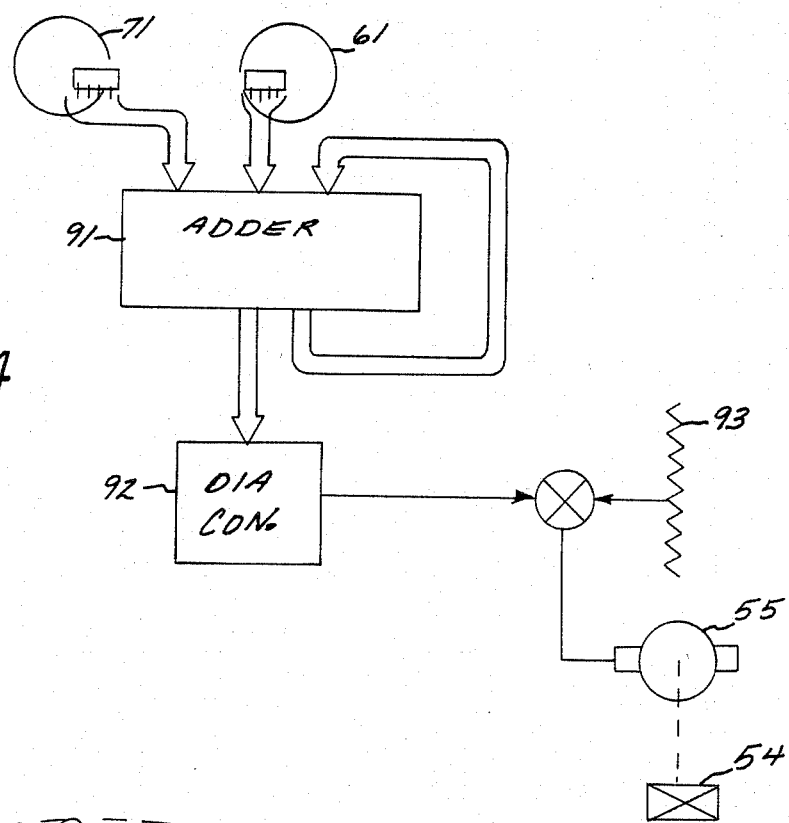
FIG. 4 is a logic diagram illustrating the integrating effect of a thrust loop coupled with the attitude sensing logic set out herein.

It is to be noted that through the foregoing arrangement of a parabolic support surface an envelope or metacentric perabola of lines of force MP is defined, defining the limits of stable motion within which the angular articulation of the simulated vehicle can take place. If the total of the center of gravity of the vehicle and occupant reside in that envelope balance states can occur at ground contact shown as Kl through Kn. In a similar manner lateral motion can be equally bounded by the stable envelope of a lateral parabola LP, shown in FIG. 3, defining the excursion of lateral motion as result of center of gravity shifts. Thus by the simple expedient of shifting the alignment of control stick 41 center of gravity shifts can be achieved which result in variations in attitude and thus point contact with ground. When coupled with the inertia of the simulator structure and the correct selection of the parabolic shape of the support dish 25 response rates closely approximating the longitudinal and lateral response characteristics of an aircraft can be achieved. It is of particular interest that the foregoing response rate includes second order effects around the balance points, thus closely emulating the somewhat underdamped characteristic of a high performance aircraft. These motions may then be sensed by two orthogonally aligned shaft position encoders 61 and 62, encoder 61 being aligned to sense the longitudinal or pitch motion while encoder 62 is aligned to sense lateral or roll motion. Encoders 61 and 62 may be suspended from the underside of disk 20 within the interior of dish 25 and are thus protected from damage and may include bobweights thereon to provide the necessary gravitational preference which will be maintained in both pitch and roll. The output of encoders 61 and 62 may then be fed to a microprocessor 65 and to an image generator 66 which at the same time received the output of yet another shaft encoder 71 sensing the position of the throttle handle 37. In addition to the foregoing inputs microprocessor 65 may also receive the output of a memory bank 75 loaded with a selected program 80 which may impress onto the image generator 66 images of targets and other matter. Image generator 66 then combines all of these inputs to provide the necessary signal to a CRT control stage 85 which controls the video display 35. In addition, as shown in FIG. 4 the output of encoder 71 may be collected with the output of encoder 61 in an adder 91, operating in the substraction mode, the out adder 91 being recirculated back to the input to effect an integrating function. This then will integrate the difference between throttle position and pitch attitude simulating the acceleration and deceleration that occurs in an aircraft as result of throttle and pitch effects. This added output of adder 91 may then be collected in a (D/A) digital to analog converter 92 which drives the summing node of a servo loop including the servo motor 55. That same summing node also receives the output of a feedback potentiometer 93 which effectively duplicates the spring tension achieved through the advancement of the worm 53 within the ballnut 54. Thus the stick feel or the force response characteristics of the stick may be altered in some coherent relationship with the virtual speed achieved by the vehicle, emulating the force build-up on the control surfaces that normally occurs in an aircraft with an increase in speed. This emulated or integrated velocity accumulated in adder 91 may also be fed to microprocessor 65 and image generator 66 to further enhance the display features appearing on video display 35.

It is to be noted that the control over the video display and the features displayed thereon may be variously implemented depending on the degree of visual fidelity that one may want to exercise. While there may be various extraneous inputs displayed on the video display the most basic formulation process by the microprocessor 65 are the typical equations of motion (linearized Euler equations of motion) characteristically defining the motion of an aircraft in unconstrained space. Thus, for example, program 80 may include the following relationships:

$$T - D = m\left(\frac{dV}{dt}\right)$$

$$My = Iy\left(\frac{dQ}{dt}\right)$$

$$Mx = Ix\left(\frac{dP}{dt}\right)$$

where: T is thrust, D is drag, m is mass, Mx and My are aerodynamic moments about the x and y axes, Ix and Iy are moments of inertia and V, Q and P are respectively velocity, pitch rate and roll rate, which are loaded through memory 75 and which thus control the arithmetic operations of the microprocessor 65, it being understood that the appropriate microprocessor language be used in implementing these functions. In addition to these emulated equations of motion one may also impress onto a program 80 various random events (such as those implemented through the use of a random number generator) which may include events like turbulence or shock obtained through explosion.

To provide some physical feel attendant to such emulated shock or turbulence the output of microprocessor 65 may be further branched off to a solenoid valve 101 (illustrated in FIG. 3) which vents to the atmosphere the cavity between the disk 20 and the dish 25, that same cavity being continuously pressurized by a compressor or blower 102 which may be driven at a rate corresponding to the velocity outputs obtained out of adder 91. By selecting material structures for the dish 25 like for example fiberglass or other reinforced composite material a certain amount of flexure will take place with variations in pressure. Such flexure, in particular, will be most pronounced over the extreme excursion contact areas, i.e. where the parabolic surface begins to flatten out, once again, emulating in the most pronounced manner turbulence inputs in pitched up or pitched down or rolled alignment. To achieve some coherence between the level of turbulence impact and the velocity at which the vehicle travels compressor or blower 102 may be driven by a variable frequency motor 103 which, in turn through a variable frequency generator 104, responds to a voltage controlled oscillator 105 driven by the output of the D to A converter 92.

With the foregoing arrangement of logic and structure one may thus obtain a reasonably good simulation of attitude and force input to the occupant. While admittedly such implementation does not meet the exacting requirements of a full fidelity simulator, an interesting effect is achieved. In the first instance the occupant shall feel attitude changes which are in some coherence with the deployment of the control stick and which by appropriate selection of dish dimensions and total inertia will entail dynamic responses quite similar to that of an operating aircraft. Furthermore, the force required to translate the stick with the centering tension thereon which, in turn, is produced by computing attitude and thrust, once again, combine the dominant effects which control the speed of the aircraft. Thus a reasonably good perception of force and attitude is achieved which, when coupled with a video display isolated from any other extraneous optical sense inputs, will provide a substantially effective feel corresponding to the feel that one experiences in operating an aircraft. All these features are achieved in a relatively simple mechanism which when conformed to a parabola entails all of the stability aspects that one experiences during the extreme ranges of flight attitude. In this manner a relatively inexpensive structural arrangement provides all of the sense features in a simulator with sufficient fidelity to satisfy all if not the most critical users.

Figure 5:
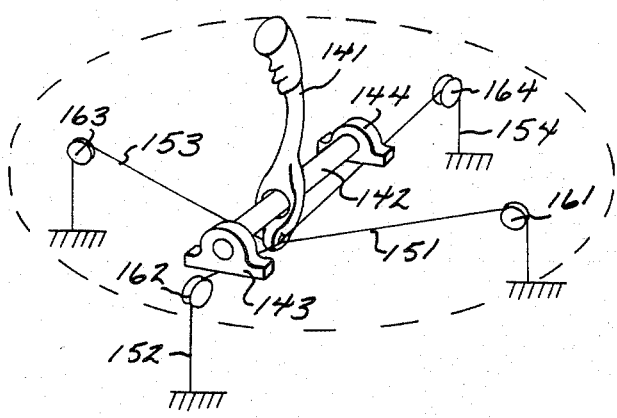
FIG. 5 is yet another implementation of a control stick arrangement useful with the invention herein.

In an alternative implementation, according to the illustration in FIG. 5, the control stick may be implemented by way of a control stick 141 once again pivoted on a tube 142 which is mounted for rotation in the fore and aft bearing 143 and 144, stick 141 extending below the tube to pick up the ends of four cables 151–154 which, in turn, pass over turning rollers 161–164 suspended from the underside of disc 20 to be turned therearound to attachment points on the ground G. In this form fore and aft manipulation of stick 141, similar to stick 41, will impose attitude changes of the assembly which, once again, may be picked up by the appropriate encoders and combined in the manner set out above. While this last implementation sacrifices some of the dynamics of motion which are available through the use of weighted control sticks there is a safety advantage obtained herein by constraining the disk to a limited degree of angular motion relative the ground. Thus in such instances where safety or other restrictions dictate some limit on the angular excursion or contact between the bumper 28 and ground this cable arrangement may be utilized, although with some loss of fidelity of emulation. Once again, the major portions of the motion are achieved through the use of the parabolic dish in a manner similar to the description above.

Obviously many modifications and changes may be made to the foregoing description without departing from the spirit of the invention. It is therefore intended that the scope of the invention be determined solely on the claims appended hereto.

What is claimed is:

1. Apparatus conformed to simulate the angular motions of a flight vehicle comprising:
   an enclosure provided with a seat conformed to support an occupant and an accessway for ingress and egress to said seat;
   a parabolic support surface interposed between said enclosure and ground conformed for angular displacement relative ground in response to changes of center of gravity alignment of said enclosure; and
   moveable control means deployed in said enclosure and provided with weights for changing the alignment of said center of gravity, including a plurality of pivotal members each supporting a corresponding weight, said members being adjustably linked to each other.

2. Apparatus according to claim 1 further comprising:
   spring means connected to said control means for maintaining the alignment thereof in a predetermined relationship relative said enclosure.

3. Apparatus according to claim 2 wherein:
   said parabolic support surface is formed of a resilient material arranged to define a hermetic cavity subjacent said enclosure including pressurization means for selective expansion and contraction thereof.

4. An emulator for emulating the angular motion of a flight vehicle comprising:

an enclosure including a seat for use by an occupant and a moveable access closure for providing means for ingress and egress to said seat;

a parabolic support surface fixed subjacent said enclosure and conformed to provide stable states of alignment at various angular attitudes relative ground; and moveable control means deployed in said enclosure for altering the angular alignment thereof, including a plurality of pivotal members each supporting a corresponding weight, said members being adjustably linked to each other.

5. Apparatus according to claim 4 further comprising:

detection means deployed in said enclosure for sensing the angular alignment thereof relative ground and for producing an electrical signal indicative of said sensed alignment; and video display means mounted in said enclosure and operatively connected to said detection means for producing a display in correspondence with said electrical signals.

6. Apparatus according to claim 5 further comprising:

a throttle control actuator mounted for pivotal motion in said enclosure for emulating the throttle control of a flight vehicle.

7. Apparatus according to claim 6 further comprising:

sensing means connected to sense the pivotal motion of said throttle control actuator for producing a throttle signal indicative of the pivotal alignment thereof.

8. Apparatus according to claim 7 further comprising:

adding means connected to receive said throttle and electrical signals for integrating the difference therebetween.

* * * * *